(12) United States Patent
Hu et al.

(10) Patent No.: US 9,936,554 B2
(45) Date of Patent: Apr. 3, 2018

(54) TELEVISION BACKLIGHT DRIVING DEVICE AND THE DRIVING METHOD THEREOF

(71) Applicant: SHENZHEN SKYWORTH-RGB ELECTRONIC CO., LTD, Shenzhen (CN)

(72) Inventors: Xiangfeng Hu, Shenzhen (CN); Chao Zeng, Shenzhen (CN)

(73) Assignee: SHENZHEN SKYWORTH-RGB ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 15/323,955

(22) PCT Filed: Jan. 6, 2016

(86) PCT No.: PCT/CN2016/070267
§ 371 (c)(1),
(2) Date: Jan. 4, 2017

(87) PCT Pub. No.: WO2017/049815
PCT Pub. Date: Mar. 30, 2017

(65) Prior Publication Data
US 2017/0303360 A1    Oct. 19, 2017

(30) Foreign Application Priority Data
Sep. 25, 2015 (CN) .......................... 2015 1 0619747

(51) Int. Cl.
*H05B 33/08* (2006.01)
*H04N 5/63* (2006.01)

(52) U.S. Cl.
CPC ........... *H05B 33/0851* (2013.01); *H04N 5/63* (2013.01); *H05B 33/0818* (2013.01)

(58) Field of Classification Search
CPC ...... H04N 5/63; H05B 37/02; H05B 33/0815; H05B 33/0845; H05B 33/0827;
(Continued)

(56) References Cited

U.S. PATENT DOCUMENTS 7,295,180 B2* 11/2007 Ichikawa ............... G09G 3/342
                                                             315/308
8,120,283 B2*  2/2012 Tanaka ............... H05B 33/0827
                                                             315/193
(Continued)

FOREIGN PATENT DOCUMENTS

CN    102222490 A    10/2011
CN    202111796 U    1/2012
(Continued)

OTHER PUBLICATIONS

The World Intellectual Property Organization (WIPO) International Search Report for PCT/CN2016/070267 dated May 4, 2016.

*Primary Examiner* — Haissa Philogene
(74) *Attorney, Agent, or Firm* — Anova Law Group, PLLC (57) ABSTRACT

The present invention discloses a television backlight driving device and the driving method thereof, the said television backlight driving device comprises: an AC-DC module and an LED driving module; when a power is on, the said AC-DC module transforms an input supplied AC power into a DC power before supplying to the backlight LED lightstrip; comparing to the existing backlight driving methods, there is no second process of DC-DC needed, saving a system cost of the power, and improving an efficiency of the system; when the LED driving module determines the detection current larger than the preset current but smaller than the first threshold, a constant-current output for LED current is controlled by adjusting the duty ratio; when the detection current is larger than the first threshold or smaller (Continued)

than the preset current, the LED driving module feeds back the detection current to the AC-DC module; the AC-DC module then controls the DC voltage according to the detection current; different methods for adjustment may save a power consumption, as well as achieving an effect of stabling the current output; it owns a simple circuit structure, and a high system reliability.

9 Claims, 5 Drawing Sheets

(58) Field of Classification Search
CPC ............ H05B 33/0851; H05B 33/0818; H05B 37/0227; G09G 3/32; G09G 3/342; G09G 3/3406; G09G 2310/0237; G09G 2320/064; G09G 2320/0646; H02M 3/156; H02M 2001/0009; H02M 2001/4291; Y02B 20/346
USPC ........ 315/247, 291, 224, 307, 360; 345/102, 345/589, 690
See application file for complete search history.

(56) References Cited

U.S. PATENT DOCUMENTS

| | | | | |
|---|---|---|---|---|
| 8,456,412 | B2* | 6/2013 | Honbo | G09G 3/342 345/102 |
| 9,572,211 | B2* | 2/2017 | Reiter | H05B 33/0845 |
| 9,596,725 | B2* | 3/2017 | Hu | H02M 3/156 |
| 9,699,836 | B2* | 7/2017 | Bahrehmand | H05B 33/0815 |
| 2010/0066754 | A1* | 3/2010 | Kuroda | G09G 3/3406 345/589 |

FOREIGN PATENT DOCUMENTS

| | | |
|---|---|---|
| CN | 103415109 A | 11/2013 |
| CN | 103458578 A | 12/2013 |
| CN | 104253959 A | 12/2014 |
| CN | 204231217 U | 3/2015 |
| CN | 105187749 A | 12/2015 |

\* cited by examiner

S100
When a power is on, the AC-DC module transforms the input supplied AC power into a DC voltage and supplies to the backlight LED lightstrip S200
When the LED driving module determines the detection current is larger than the preset current but smaller than the first threshold, it controls a constant-current output for the LED current through PWM dimming; when the detection current is larger than the first threshold or smaller than the preset current, the LED driving module feeds back the detection current to the AC-DC module S300
The AC-DC module controls the value of the output DC voltage according to the detection current, making a constant-current output for the LED current

TELEVISION BACKLIGHT DRIVING DEVICE AND THE DRIVING METHOD THEREOF

CROSS-REFERENCES TO RELATED APPLICATIONS

This application is a national stage application of PCT Patent Application No. PCT/CN2016/070267, filed on Jan. 6, 2016, which claims priority to Chinese Patent Application No. 201510619747X, filed on Sep. 25, 2015, the content of all of which is incorporated herein by reference.

FIELD OF THE INVENTION

The present invention relates to the field of power source switch technology, and, more particularly, to a television backlight driving device and the driving method thereof.

BACKGROUND

Since an LED light is working at a constant current working state, when the current of the LED light is constant, a voltage of the LED light could have a certain deviation, thus in a traditional LED backlight driving power source, it is always adopting a constant-current driving source to drive the LED backlights. Shown as FIG. 1, an existing backlight driving method is always outputting a DC after transformed by an AC-DC module, before ensuring a constant-current output for an LED lightstrip through raising or lowering the voltage by a DC-DC module. Since there are two steps of transformations needed from an AC source to the LED lightstrip, (that is, transforming from AC to DC, then from DC to DC), it causes a low efficiency for the transformation. Also, a DC-DC processing section needs a plurality of power components (a power switch circuit and a control circuit) with a plurality of corresponding topologies, which causes a relatively high cost.

Therefore, the current technology needs to be improved and developed.

BRIEF SUMMARY OF THE DISCLOSURE

According to the above described defects, the purpose of the present invention is providing a television backlight driving device and the driving method thereof, in order to solve the problem in the prior arts that an existing backlight driving needs to undergo two steps of transformations, causing a low efficiency.

In order to achieve the above mentioned goals, the technical solution of the present invention to solve the technical problems is as follows:

A television backlight driving device, connecting to an LED lightstrip, wherein, the said television backlight driving device comprises: an AC-DC module and an LED driving module;

when a power is on, the said AC-DC module transforms an input supplied AC power into a DC power before supplying to the backlight LED lightstrip, when the LED driving module determines the detection current larger than the preset current but smaller than the first threshold, a constant-current output for LED current is controlled by adjusting the duty ratio; when the detection current is larger than the first threshold or smaller than the preset current, the LED driving module feeds back the detection current to the AC-DC module; the AC-DC module then controls a value of the DC voltage according to the detection current.

The said television backlight driving device, wherein, the said AC-DC module comprises a main control circuit, a transform circuit, an output circuit and a second feedback circuit;

the said main control circuit transmits the input supplied AC power to the transform circuit for a voltage transformation, the second feedback circuit regulates the transformed voltage before filtering and outputting a DC voltage by the output circuit to the backlight LED lightstrip for power supply; and the second feedback circuit generates a corresponding control signal to the main control circuit according to the detection current feedback from the LED driving module, the main control circuit then adjusts the DC voltage according to the control signal.

The said television backlight driving device, wherein, the LED driving module comprises a dimmer switch, a first feedback circuit and a backlight control circuit;

the said backlight control circuit controls an on-off state of the dimmer switch to adjust the current passing through the LED lightstrip, the first feedback circuit feeds back a detection voltage to the backlight control circuit, the backlight control circuit calculates the detection current passing through the LED lightstrip based on the detection voltage;

when the backlight control circuit determines the detection current larger than the preset current but smaller than the first threshold, the duty ratio of the dimmer switch is adjusted to reduce the current passing through the LED lightstrip;

when the backlight control circuit determines the detection current larger than the first threshold or smaller than the preset current, the detection current is fed back to the second feedback circuit.

The said television backlight driving device, wherein, the said second feedback circuit comprises a first resistor, a second resistor, a third resistor, a fourth resistor, a first capacitor and an optocoupler; one end of the said first resistor connects to one end of the third resistor and the output circuit; other end of the first resistor connects to the backlight control circuit, as well as gets grounded through the second resistor, it also connects to one end of the fourth resistor through the first capacitor; other end of the said third resistor connects to a positive pole of the optocoupler, other end of the said fourth resistor connects to a negative pole of the optocoupler and the backlight control circuit, a collector of the optocoupler connects to the main control circuit, an emitter of the optocoupler gets grounded.

A driving method for the television backlight driving device, wherein, it comprises:

when a power is on, the AC-DC module transforms the input supplied AC power into a DC voltage and supplies to the backlight LED lightstrip;

when the LED driving module determines the detection current is larger than the preset current but smaller than the first threshold, it controls a constant-current output for the LED current through PWM dimming; when the detection current is larger than the first threshold or smaller than the preset current, the LED driving module feeds back the detection current to the AC-DC module;

the AC-DC module controls the value of the output DC voltage according to the detection current, making a constant-current output for the LED current.

The said television backlight driving method, wherein, the step of: when a power is on, the AC-DC module transforms the input supplied AC power into a DC voltage and supplies to the backlight LED lightstrip, comprises specifically:

a main control circuit transmits the input supplied AC power to a transforming circuit for a voltage transformation;

a second feedback circuit regulates the transformed voltage, before outputting a DC voltage to the backlight LED lightstrip for power supply through an output circuit filter;

the backlight control circuit controls the duty ratio of a dimmer switch to be 100%.

The said television backlight driving method, wherein, the step of: when the LED driving module determines the detection current is larger than the preset current but smaller than the first threshold, it controls a constant-current output for the LED current through PWM dimming; when the detection current is larger than the first threshold or smaller than the preset current, the LED driving module feeds back the detection current to the AC-DC module, comprises specifically:

the first feedback circuit feeds back the detection voltage to the backlight control circuit, the backlight control circuit calculates the value of the detection current passing through the LED lightstrip, based on the detection voltage;

when the backlight control circuit determines the detection current equal to the preset current, determination will be continued without any processing;

when the backlight control circuit determines the detection current larger than the preset current but smaller than the first threshold, the duty ratio of the dimmer switch is adjusted to adjust the detection current;

when the backlight control circuit determines the detection current larger than or equal to the first threshold or smaller than the preset current, the detection current is fed back to the second feedback circuit.

The said television backlight driving method, wherein, the step of: the AC-DC module controls the value of the output DC voltage according to the detection current, making a constant-current output for the LED current, comprises specifically:

the second feedback circuit generates the according control signal to the main control circuit according to the detection current;

the main control circuit adjusts the value of the DC voltage according to the control signal.

The said television backlight driving method, wherein, the step of: when the backlight control circuit determines the detection current is larger than the preset current but smaller than the first threshold, the duty ratio of the dimmer switch is adjusted to adjust the detection current, comprises specifically:

when the backlight control circuit determines the detection current is larger than the preset current but smaller than the first threshold, the backlight control circuit reduces the duty ratio of the dimmer switch;

the first feedback circuit feeds back the present voltage for detection to the backlight control circuit, which determines if the detection current is larger than the preset current but smaller than the first threshold;

if the detection current is larger than the preset current but smaller than the first threshold, the backlight control circuit continue lowering the duty ratio of the dimmer switch, obtaining the current detection voltage and making determinations, until the duty ratio reaches a minimum;

if the detection current is smaller than the preset current, the backlight control circuit may increase the duty ratio of the dimmer switch, continue obtaining the current detection voltage and making determinations, until the duty ratio reaches 100%;

if the detection current equals to the preset current, continue obtaining the current detection voltage and making determinations.

Comparing to current technologies, the television backlight driving device and the driving method thereof, provided in the present invention, wherein, when a power is on, the said AC-DC module transforms an input supplied AC power into a DC power before supplying to the backlight LED lightstrip; comparing to the existing backlight driving methods, there is no second transformation of DC-DC needed, saving a system cost for the power, and improving an efficiency of the system; when the LED driving module determines the detection current larger than the preset current but smaller than the first threshold, a constant-current output for LED current is controlled by adjusting the duty ratio; when the detection current is larger than the first threshold or smaller than the preset current, the LED driving module feeds back the detection current to the AC-DC module; the AC-DC module then controls the DC voltage according to the detection current; using different methods for adjustment may save a power consumption, as well as achieving an effect of stabling the current output; it owns a simple circuit structure, and a high system reliability.

DETAILED DESCRIPTION OF EMBODIMENTS

The present invention provides a television backlight driving device and the driving method thereof, the said television backlight driving device drives an LED backlight module directly through an output winding of a transformer, without a second voltage raising or lowering required to drive a backlight lightstrip. In order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
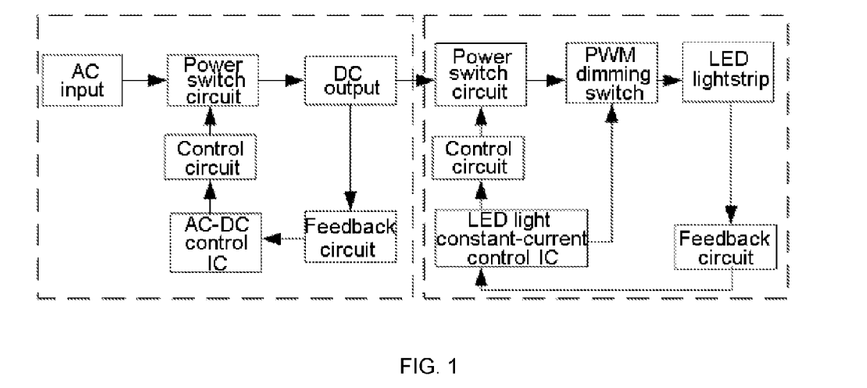
FIG. 1 illustrates a block diagram of an existing LED backlight driving power source.
Figure 2:
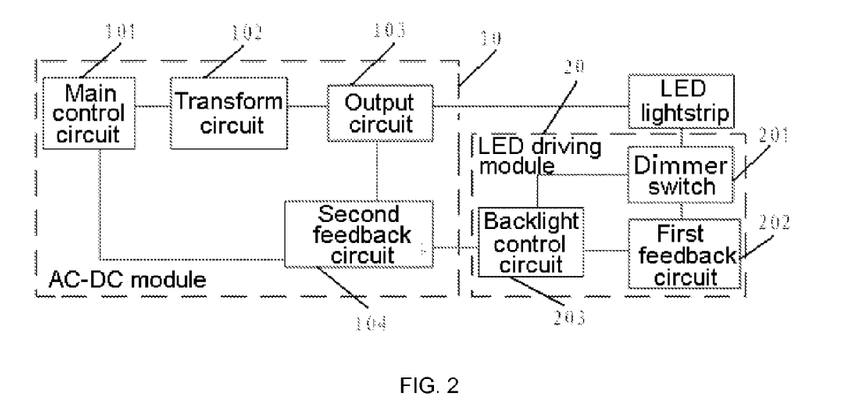
FIG. 2 illustrates a block diagram of a television backlight driving device as provided in the present invention.

Referencing to FIG. 1, a television backlight driving device provided in the present invention comprises an AC-DC module 10 and a connected LED driving module 20. When a power is on, directly through the said AC-DC module 10, an input supplied AC power is transformed into a DC voltage $V_{LED}$ before supplied to a backlight LED lightstrip. When the LED driving module 20 determines a detection current is larger than a preset current but smaller than a first threshold, through adjusting a duty ratio, a constant-current for an LED current is controlled to output; when the detection current is larger than (or equal to) the first threshold or smaller than the preset current, the LED driving module 20 feeds back the detection current to the AC-DC module 10. The AC-DC module 10 controls a value of the DC voltage $V_{LED}$ through the detection current, in order to maintain the constant-current stable. Since the present embodiment doesn't need to maintain a feather of constant-current output by controlling an existing constant-current power circuit, a second process to a DC-DC power circuit may be omitted.

Wherein, the said AC-AC module 10 comprises a main control circuit 101, a transform circuit 102, an output circuit 103 and a second feedback circuit 104. The said LED driving module 20 comprises a dimmer switch 201, a first feedback circuit 202 and a backlight control circuit 203.

The said main control circuit 101 transmits the input supplied AC power to the transform circuit 102 for a voltage transformation, the second feedback circuit 104 regulates the transformed voltage before filtering and outputting a DC voltage by the output circuit 103 to the backlight LED lightstrip for power supply. The backlight control circuit 203 controls an on-off state of the dimmer switch 201 to adjust the current passing through the LED lightstrip. The said first feedback circuit 202 feeds back a detection voltage to the backlight control circuit 203 according to the current passing through the LED lightstrip. The backlight control circuit 203 may calculate the actual value of the detection current passing through the LED lightstrip based on the detection voltage.

The backlight control circuit 203 compares the detection current to the preset current. When the detection current is larger than the preset current but smaller than the first threshold, the backlight control circuit 203 adjusts the duty ratio of the dimmer switch 201, to reduce the current passing through the LED lightstrip. When the detection current is larger than the first threshold or smaller than the preset current, it will have no way to satisfy a request of constant-current by adjusting the dimmer switch 201, now, the backlight control circuit 203 feeds back the detection current to the second feedback circuit 104. The second feedback circuit 104 generates a corresponding control signal and supplies to the main control circuit 101 according to the said detection current, the main control circuit 101 then adjusts the DC voltage according to the control signal, and achieves an effect of constant-current output for LED.

The present embodiment adjusts the lightstrip current by changing the duty ratio of a PWM dimming switch (i.e., the dimmer switch) when the current fluctuation is relatively small. When the voltages between a screen and a body differ a lot, the method of adjusting the lightstrip current simply relying on the PWM dimming switch, may cause a temperature of the PWM dimming switch tube pretty high, and may require a pretty high voltage resistance of the PWM dimming switch tube. Under the high temperature and the high voltage, a common PWM dimming switch tube may be destroyed, while a special PWM dimming switch tube costs too much, and it may increase a power consumption of the whole device. Therefore, when the PWM dimming switch is not enough for adjustments, it will be fed back to a primary module (i.e., an AC-DC module) to reduce the DC voltage output.

In the present embodiment, the said transform circuit 102 comprises a first switch tube S1, a second switch tube S2 and a transformer T; a drain and a gate of the said first switch tube S1 connect to the main control circuit 101, a source of the first switch tube S1 connects to a drain of the second switch tube S2 and a same name end of a first primary winding L1 of the transformer T, a gate and a source of the second switch tube S2 connect to the main control circuit 101, a source of the second switch tube S2 further connects to one end of a second primary winding L2 of the transformer T, a different names end of the first primary winding L1 connects to the other end of the second primary winding L2; both a same name end and a different names end of a first secondary winding L3 connect to the transform circuit 102, the same as a second secondary winding L4.

The said output circuit 103 comprises a first diode D1, a second diode D2 and a filter capacitor Cr; a positive pole of the said first diode D1 connects to a same name end of the first secondary winding L3; a negative pole of the said first diode D1 connects to a negative pole of a second diode D2, a second feedback circuit 104, one end of a filter capacitor Cr and a positive pole + of the LED lightstrip; a positive pole of the said second diode D2 connects to a different names end of the second secondary winding L4, other end of the filter capacitor Cr connects to a different names end of the first secondary winding L3, a same name end of the second secondary winding L4 and the ground.

The said second feedback circuit 104 comprises a first resistor R1, a second resistor R2, a third resistor R3, a fourth resistor R4, a first capacitor C1 and an optocoupler OP; one end of the said first resistor R1 connects to one end of the third resistor R3 and the negative pole of the first diode D1; other end of the first resistor R1 connects to the backlight control circuit, as well as gets grounded through the second resistor R2, it also connects to one end of the fourth resistor R4 through the first capacitor C1; other end of the said third resistor R3 connects to a positive pole of the optocoupler OP, other end of the fourth resistor R4 connects to a negative pole of the optocoupler OP and the backlight control circuit 203, a collector of the optocoupler OP connects to the main control circuit 101, an emitter of the optocoupler OP gets grounded. Wherein, a resistance of the first resistor R1 and the second resistor R2 determines a value of the DC voltage $V_{LED}$, a voltage output from the negative pole of the first diode D1 gets divided by the first resistor R1 and the second resistor R2, which equals to outputting the DC voltage $V_{LED}$ stably as a preset value.

The said dimmer switch 201 comprises a triode Q1, a base of the said triode Q1 connects to the backlight control circuit 203, a collector of the said triode Q1 connects to the negative pole of the LED lightstrip, an emitter of the said triode Q1 connects to the first feedback circuit 202. The said first feedback circuit 202 includes a sampling resistor Rs, one end of the said sampling resistor Rs connects to the emitter of the triode Q1 and the backlight control circuit 203, the other end of the sampling resistor Rs gets grounded. One end of the sampling resistor Rs collects the detection voltages and transmits to the backlight control circuit 203. The backlight control circuit 203 is able to calculate the current passing through the LED lightstrip, based on the detection voltages and the resistances of the sampling resistor Rs. In the backlight control circuit 203, a preset circuit is stored (such as 100 mA).

Figure 3:
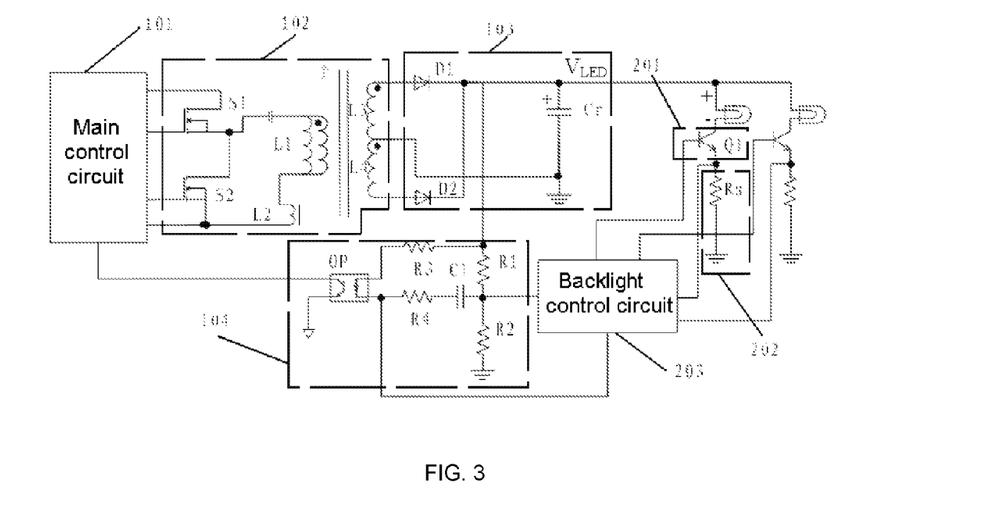
FIG. 3 illustrates a circuit diagram of a television backlight driving device as provided in the present invention.

In the present embodiment, when matching a multichannel screen, a number of the LED lightstrip increases, a plurality of the first feedback circuits and a plurality of the dimmer switches are increasing accordingly, which has a same working principle. That is, a number of the triode, a number of the sampling resistors and a number of the LED lightstrip are equal, and are connected accordingly, as shown in FIG. 3.

Figure 4:
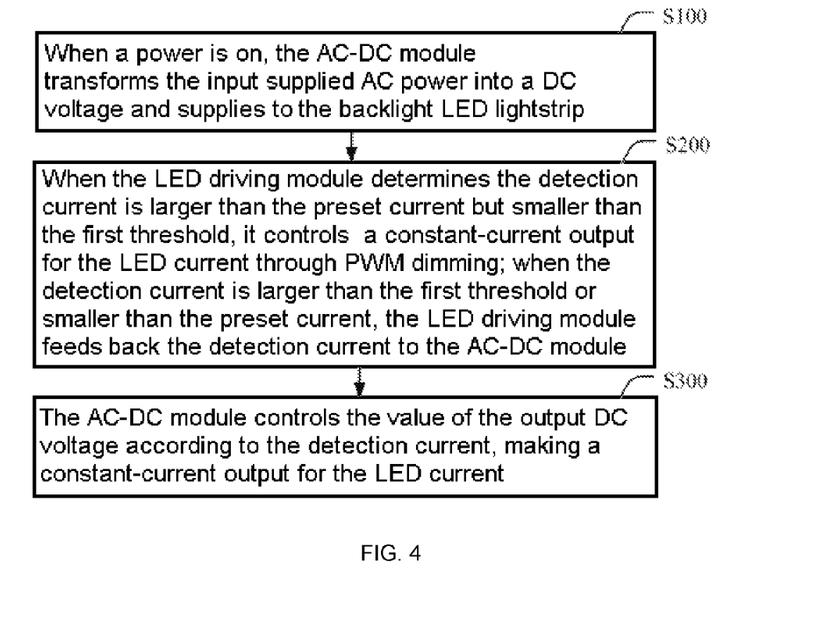
FIG. 4 illustrates a flowchart on a television backlight driving method as provided in the present invention.

Based on the above said television backlight driving device, an embodiment of the present invention further provides a driving method for the television backlight driving device. Referencing to both FIG. 3 and FIG. 4 at the same time, the said driving method includes:

S100, when a power is on, the AC-DC module transforms the input supplied AC power into a DC voltage and supplies to the backlight LED lightstrip;

S200, when the LED driving module determines the detection current is larger than the preset current but smaller than the first threshold, it controls a constant-current output for the LED current through PWM dimming; when the detection current is larger than the first threshold or smaller than the preset current, the LED driving module feeds back the detection current to the AC-DC module;

S300, the AC-DC module controls the value of the output DC voltage according to the detection current, making a constant-current output for the LED current.

Before the said step S100, it further includes a system initialization step, that is, obtaining a voltage range of 60V~80V, corresponding to a rated current of the lightstrip following a lightstrip specification.

Figure 5:
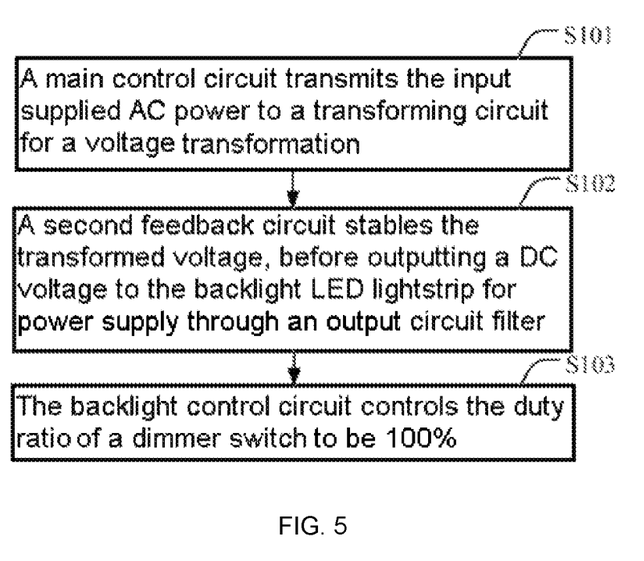
FIG. 5 illustrates a flowchart on a method in the step S100 of the television backlight driving method as provided in the present invention.

Shown as FIG. 5, the said step S100 includes specifically:

S101, a main control circuit transmits the input supplied AC power to a transforming circuit for a voltage transformation.

S102, a second feedback circuit regulates the transformed voltage, before outputting a DC voltage to the backlight LED lightstrip for power supply through an output circuit filter.

It should be understood that, at a beginning stage after powered on, the DC voltage $V_{LED}$ obtained after stabilization is 70V, which is determined by the resistances of both the first resistor R1 and the second resistor R2. In the following working processes, a real DC voltage $V_{LED}$ may change all the time.

S103, the backlight control circuit controls the duty ratio of a dimmer switch to be 100%. This specific step presets the triode Q1 to be full conduction, now a plurality of following states may appear:

1. A voltage required by the real LED lightstrip to reach the rated current is smaller than the DC voltage output from the AC-DC module; which means, under a control of 100% duty ratio, a real detection current of an LED lightstrip is larger than a preset current. Wherein, "larger than" may be further divided into "slightly larger" and "pretty larger".

2. A voltage required by the real LED lightstrip to reach the rated current is larger than the DC voltage output from the AC-DC module; which means, under a control of 100% duty ratio, a real detection current of an LED lightstrip is smaller than a preset current.

3. A voltage required by the real LED lightstrip to reach the rated current equals to the DC voltage output from the AC-DC module, and now the system is stable and no adjustment needed.

Here, it is processed through the step S200 after being determined.

Figure 6:
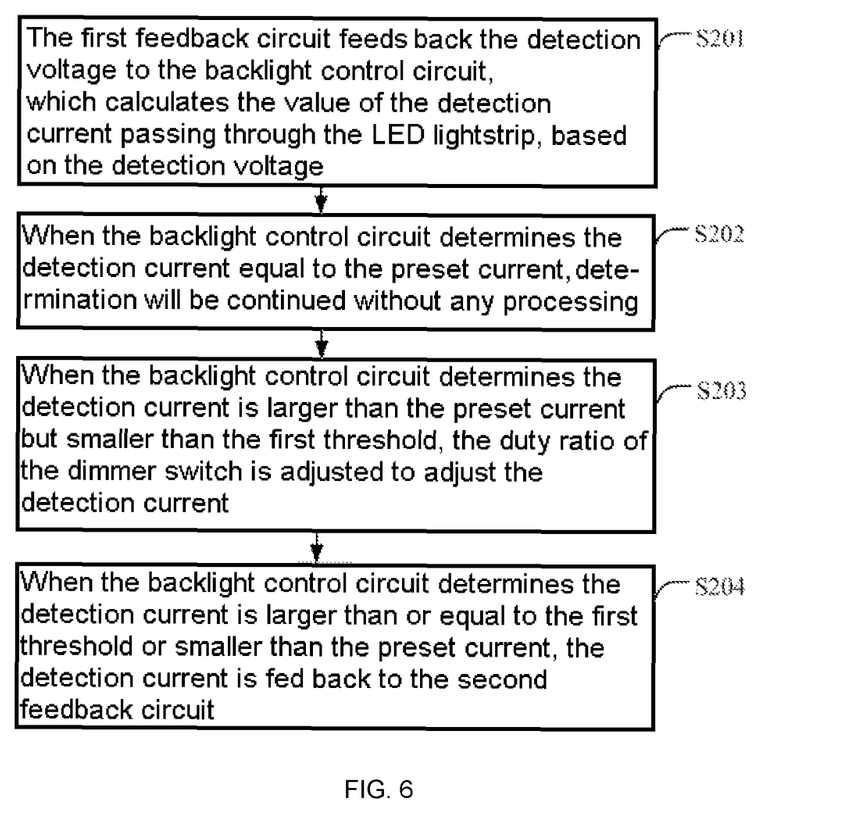
FIG. 6 illustrates a flowchart on a method in the step S200 of the television backlight driving method as provided in the present invention.

Shown as FIG. 6, the said step S200 includes specifically:

S201, the first feedback circuit feeds back the detection voltage to the backlight control circuit, which calculates the value of the detection current passing through the LED lightstrip, based on the detection voltage. It is calculated by combing with the resistance of the sampling resistor Rs.

S202, when the backlight control circuit determines the detection current equal to the preset current, determination will be continued without any processing. This specific step is pointing to the processing method described in the above said state 3.

S203, when the backlight control circuit determines the detection current is larger than the preset current but smaller than the first threshold, the duty ratio of the dimmer switch is adjusted to adjust the detection current.

It should be understood that, since the duty ratio has been adjusted to 100% in the above said steps, in the following adjustments, the duty ratio may only be decreased before being increased. Decreasing the duty ratio is corresponding to decreasing the according detection current; increasing the duty ratio is corresponding to increasing the according detection current. When the detection current is larger than the preset current and smaller than the first threshold, it means the detection current is slightly larger than the preset current, it is able to be adjusted through duty ratios. If it is much larger, that is, it is larger than or equal to the first threshold, then the triode Q1 will have no way to lower the detection current to a value needed, which will need to be adjusted by an AC-DC module. After each adjustment, the present detection current will be collected again to continue determinations.

In the said step 203, if the backlight control circuit determines the detection current is larger than the preset current but smaller than the first threshold, that means the detection current is slightly larger than the preset current. Now, the backlight control circuit reduces the duty ratio of the dimmer switch, which may lower the detection current.

In the present embodiment, a decreasing range for the duty ratio is 80%~100%. In a specific implementation, it may further set a minimum value as 50% (for the triode Q1, the requirements for voltage resistance and temperature resistance are pretty high, and the cost is high), that means, the range is 50%~100%. The present embodiment has no limitation for the minimum value of the duty ratio. When the minimum value is 80%, the circuit has a minimum power consumption, and a low requirement for both voltage resistance and temperature resistance of the triode Q1, as well as a cost saving. Decreasing the duty ratio may be achieved gradually to 80% following a default schedule, such as reducing once every 5%.

Each time, after reducing the duty ratio, continue determining whether the detection current is larger than the preset current but smaller than the first threshold or not. The first feedback circuit feeds back the present voltage for detection to the backlight control circuit, which determines if the detection current is larger than the preset current but smaller than the first threshold.

If the detection current is still larger than the preset current but smaller than the first threshold, the backlight control circuit continues lowering the duty ratio of the dimmer switch, obtaining the current detection voltage and making determinations, until the duty ratio reaches the minimum of 80%.

If the duty ratio is reducing in a range of 80%~100%, making the detection current smaller than the preset current (slightly smaller, that is, the detection current is smaller than the preset current but larger than a second threshold), now it may increase the duty ratio of the dimmer switch through the backlight control circuit to raise the detection current. Afterwards, the first feedback circuit continues transmitting the collected detection current to the backlight control circuit for determination. As long as the duty ratio is in a range of 80%~100%, and the detection current is larger than the preset current but smaller than the first threshold, the detection current may be changed through adjusting the duty ratio.

If a certain adjustment makes the detection current equal to the preset current, then no processes will be done. Wherein, the said first threshold is set as 0.2V, pretty close to the preset current. By continuous repeating, it may maintain the current passing through the LED light equal to the preset current as possible, so as to achieve an effect of constant-current output.

If the duty ratio is adjusted to 80%, the detection current is still larger than the preset current but smaller than the first threshold, the dimmer switch (i.e., the triode Q1) will have no way finishing adjustments, and will transmitting the detection current to the AC-DC module will be needed for adjustment. The adjustment of the AC-DC module is following the step S300.

S204, when the backlight control circuit determines the detection current is larger than or equal to the first threshold or smaller than the preset current, the detection current is fed back to the second feedback circuit.

Figure 7:
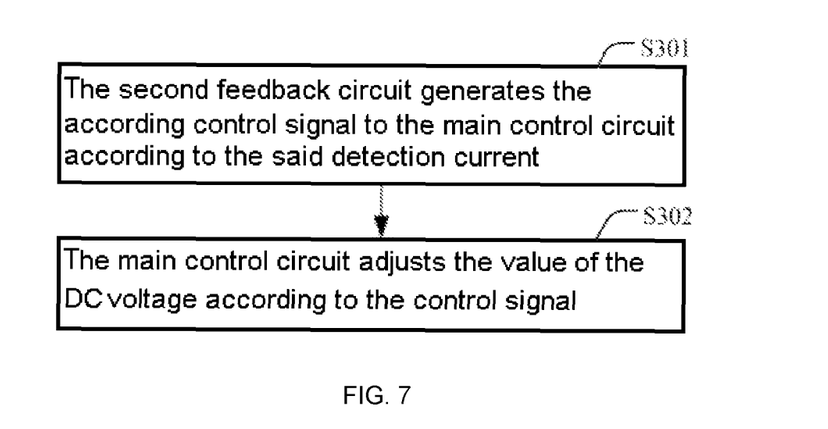
FIG. 7 illustrates a flowchart on a method in the step S300 of the television backlight driving method as provided in the present invention.

Shown as FIG. 7, the said step S300 includes specifically:

S301, the second feedback circuit generates the according control signal to the main control circuit according to the said detection current.

S302, the main control circuit adjusts the value of the DC voltage according to the control signal.

If the detection current is relatively small, a control signal for a relatively low voltage will be generated, the main control circuit will raise the DC voltage according to the control signal for a relatively low voltage, so as to increase the detection current. Similarly, if the detection current is relatively large, a control signal for a relatively large voltage will be generated, the main control circuit will lower the DC voltage according to the control signal for a relatively large voltage, so as to decrease the detection current.

It should be understood that, when the above said steps adjust the value of the DC voltage, it is kept repeating. When the power is off, all the above said steps will be ended, and the DC voltage will be cleared by discharging.

Figure 8:
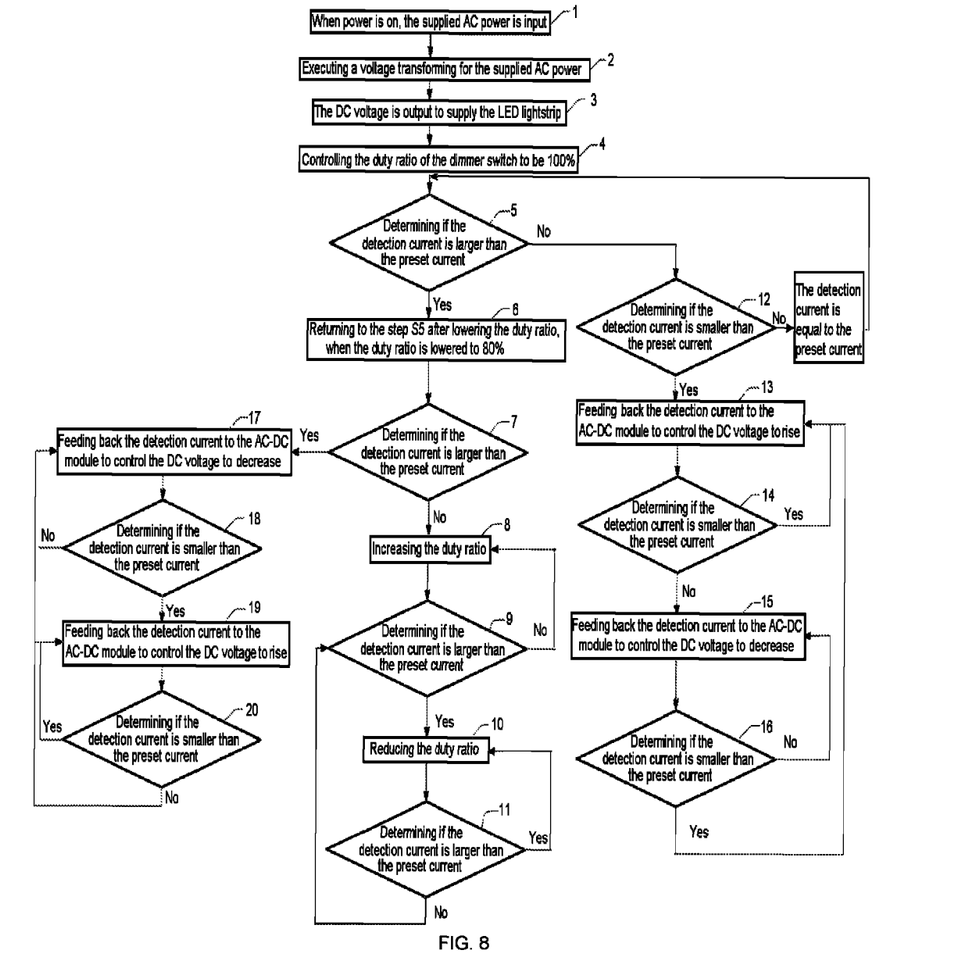
FIG. 8 illustrates a flowchart on a method in an embodiment of the television backlight driving method as provided in the present invention.

Referencing FIG. 2 to FIG. 8 together, a driving method of the said television backlight driving device is listed specifically:

S1, when the power is on, the supplied AC power is input. Specifically: the supplied AC power is input into the main control circuit.

S2, executing a voltage transforming for the supplied AC power. Specifically: the main control circuit transmits the input supplied AC power to the transform circuit for a voltage transforming.

S3, outputting a DC voltage to supply the LED lightstrip. Specifically: the second feedback circuit regulates the transformed voltage, before filtering and outputting the DC voltage to the backlight LED lightstrip for power supply through the output circuit.

S4, controlling the duty ratio of the dimmer switch to be 100%.

S5, determining if the detection current is larger than the preset current: if so, go to step S6, otherwise, go to step S12.

S6, returning to the step S5 after lowering the duty ratio, when the duty ratio is lowered to 80%, go to step S7.

S7, determining if the detection current is larger than the preset current: if so, go to step S17, otherwise, go to step S8.

S8, increasing the duty ratio.

S9, determining if the detection current is larger than the preset current: if so, go to step 10, otherwise return to step S8.

S10, reducing the duty ratio.

S11, determining if the detection current is larger than the preset current: if so, return to step S10, otherwise, return to step S9.

S12, determining if the detection current is smaller than the preset current: if so, go to step S13, otherwise, the detection current is equal to the preset current, return to step S5 and continue the determination.

S13, feeding the detection current back to the AC-DC module to control the DC voltage to rise.

S14, determining if the detection current is smaller than the preset current: if so, return to step S13, otherwise, go to step S15.

S15, feeding the detection current back to the AC-DC module to control the DC voltage to decrease.

S16, determining if the detection current is smaller than the preset current: if so, then return to step S13, otherwise, return to step S15.

S17, feeding the detection current back to the AC-DC module to control the DC voltage to decrease.

S18, determining if the detection current is smaller than the preset current: if so, go to step S19, otherwise, return to step S17.

S19, feeding the detection current back to the AC-DC module to control the DC voltage to rise.

S20, determining if the detection current is smaller than the preset current: if so, return to step S19, otherwise, return to step S17.

It should be understood that, the above said steps S8-S11, S13-S16, S17-S20 are three groups of continuously repeating steps. Through such repeating adjustments, it is possible to achieve a stable output for a DC voltage. When power is off, the above loop is broken and exit.

All above, the television backlight driving device and the driving method thereof, provided in the present invention, has a high system efficiency; comparing to the existing backlight driving method, there is no second process of DC-DC needed, which outputs a DC voltage from the AC-DC module directly to supply the backlight; also, selecting the duty ratio adjustment or returning to the AC-DC module for adjustment, based on the comparison between the detection current and the preset current, may save the power, as well as achieving the effect of stabling the current output; since it provides the backlight driving directly from the AC-DC module, the DC-DC module may save some power elements comparing to the prior art, thus it has saved some systematic cost of the power; it has a simple circuit structure, and a high system reliability.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A television backlight driving device connecting to an LED lightstrip, the television backlight driving device comprising: an AC-DC module and an LED driving module; wherein when a power is on, the AC-DC module transforms an input supplied AC power into a DC voltage before supplying to the backlight LED lightstrip, when the LED driving module determines a detection current larger than a preset current but smaller than a first threshold, a constant-current output for a LED current is controlled by adjusting a duty ratio; when the detection current is larger than the first threshold or smaller than the preset current, the LED driving module feeds back the detection current to the AC-DC module; the AC-DC module then controls the value of the DC voltage according to the detection current; wherein the AC-DC module comprises a main control circuit, a transform circuit, an output circuit and a second feedback circuit;

the main control circuit transmits the input supplied AC power to the transform circuit for a voltage transformation, the second feedback circuit regulates the transformed voltage before filtering and outputting a DC voltage by the output circuit to the backlight LED lightstrip for power supply; and the second feedback circuit generates a corresponding control signal to the main control circuit according to the detection current feedback from the LED driving module, the main control circuit then adjusts the DC voltage according to the control signal.

2. The television backlight driving device according to claim 1, wherein, the LED driving module comprises a dimmer switch, a first feedback circuit and a backlight control circuit; wherein the backlight control circuit controls an on-off state of the dimmer switch to adjust the current passing through the LED lightstrip, the first feedback circuit feeds back a detection voltage to the backlight control circuit, the backlight control circuit calculates the detection current passing through the LED lightstrip based on the detection voltage;

when the backlight control circuit determines the detection current larger than the preset current but smaller than the first threshold, the duty ratio of the dimmer switch is adjusted to reduce the current passing through the LED lightstrip; and when the backlight control circuit determines the detection current larger than the first threshold or smaller than the preset current, the detection current is fed back to the second feedback circuit.

3. The television backlight driving device according to claim 2, wherein, the second feedback circuit comprises a first resistor, a second resistor, a third resistor, a fourth resistor, a first capacitor and an optocoupler; one end of the first resistor connects to one end of the third resistor and the output circuit; other end of the first resistor connects to the backlight control circuit, as well as gets grounded through the second resistor, it also connects to one end of the fourth resistor through the first capacitor; other end of the third resistor connects to a positive pole of the optocoupler, other end of the fourth resistor connects to a negative pole of the optocoupler and the backlight control circuit, a collector of the optocoupler connects to the main control circuit, an emitter of the optocoupler gets grounded.

4. The television backlight driving device according to claim 1, wherein, the second feedback circuit comprises a first resistor, a second resistor, a third resistor, a fourth resistor, a first capacitor and an optocoupler; one end of the first resistor connects to one end of the third resistor and the output circuit; other end of the first resistor connects to the backlight control circuit, as well as gets grounded through the second resistor, it also connects to one end of the fourth resistor through the first capacitor; other end of the third resistor connects to a positive pole of the optocoupler, other end of the fourth resistor connects to a negative pole of the optocoupler and the backlight control circuit, a collector of the optocoupler connects to the main control circuit, an emitter of the optocoupler gets grounded.

5. A driving method for a television backlight driving device comprising:

when a power is on, transforming, by an AC-DC module, an input supplied AC power into a DC voltage and supplying to the backlight LED lightstrip;

when a LED driving module determines a detection current is larger than a preset current but smaller than a first threshold, controlling a constant-current output for a LED current through a PWM dimming; and when the detection current is larger than the first threshold or smaller than the preset current, feeding back, by the LED driving module, the detection current to the AC-DC module;

wherein the AC-DC module controls a value of the output DC voltage according to the detection current, making a constant-current output for the LED current.

6. The television backlight driving method according to claim 5, wherein, the step of: wherein the AC-DC module controls a value of the output DC voltage according to the detection current, making a constant-current output for the LED current, comprises:

generating, by a second feedback circuit, a control signal to a main control circuit according to the detection current; and adjusting, by the main control circuit, the value of the DC voltage according to the control signal.

7. The television backlight driving method according to claim 5, wherein, the step of: when a power is on, transforming, by an AC-DC module, an input supplied AC power into a DC voltage and supplying to the backlight LED lightstrip, comprises:

transmitting, by a main control circuit, the input supplied AC power to a transforming circuit for a voltage transformation;

regulating, by a second feedback circuit, the transformed voltage, before outputting a DC voltage to the backlight LED lightstrip for power supply through an output circuit filter; and controlling, by the backlight control circuit, a duty ratio of a dimmer switch to equal to 100%.

8. The television backlight driving method according to claim 7, wherein, the step of: when a LED driving module determines a detection current is larger than a preset current but smaller than a first threshold, controlling a constant-current output for a LED current through a PWM dimming; when the detection current is larger than the first threshold or smaller than the preset current, feeding back, by the LED driving module, the detection current to the AC-DC module, comprises:

feeding back, by a first feedback circuit, a detection voltage to the backlight control circuit, which calculates the value of the detection current passing through the LED lightstrip, based on the detection voltage;

when the backlight control circuit determines the detection current equal to the preset current, continuing the determination without any processing;

when the backlight control circuit determines the detection current larger than the preset current but smaller than the first threshold, adjusting the duty ratio of the dimmer switch to adjust the detection current; and when the backlight control circuit determines the detection current larger than or equal to the first threshold or smaller than the preset current, feeding back the detection current to the second feedback circuit.

9. The television backlight driving method according to claim 8, wherein, the step of: when the backlight control circuit determines the detection current larger than the preset current but smaller than the first threshold, adjusting the duty ratio of the dimmer switch to adjust the detection current, comprises:
- when the backlight control circuit determines the detection current is larger than the preset current but smaller than the first threshold, reducing, by the backlight control circuit, the duty ratio of the dimmer switch;
- feeding back, by the first feedback circuit, the present detection voltage to the backlight control circuit, which determines if the detection current is larger than the preset current but smaller than the first threshold;
- when the detection current is larger than the preset current but smaller than the first threshold, continuing, by the backlight control circuit, lowering the duty ratio of the dimmer switch, obtaining the current detection voltage and making determinations, until the duty ratio reaches a minimum;
- when the detection current is smaller than the preset current, increasing, by the backlight control circuit, the duty ratio of the dimmer switch, continuing obtaining the current detection voltage and making determinations, until the duty ratio reaches 100%; and
- when the detection current equals to the preset current, continuing obtaining the current detection voltage and making determinations.

* * * * *